United States Patent
Jouper et al.

(10) Patent No.: US 9,887,561 B2
(45) Date of Patent: Feb. 6, 2018

(54) LOW VOLTAGE DC DISTRIBUTION SYSTEM FOR CHARGING PASSENGER DEVICES

(71) Applicant: Astronics Advanced Electronic Systems Corp., Kirkland, WA (US)

(72) Inventors: Jeffrey A. Jouper, Newcastle, WA (US); John S. Lamb, Bothell, WA (US)

(73) Assignee: Astronics Advanced Electronic Systems Corp., Kirkland, WA (US)

(*) Notice: Subject to any disclaimer, the term of this patent is extended or adjusted under 35 U.S.C. 154(b) by 248 days.

(21) Appl. No.: 14/886,701

(22) Filed: Oct. 19, 2015

(65) Prior Publication Data

US 2016/0134138 A1    May 12, 2016

Related U.S. Application Data

(60) Provisional application No. 62/076,982, filed on Nov. 7, 2014, provisional application No. 62/076,879, filed on Nov. 7, 2014.

(51) Int. Cl.
| | |
|---|---|
| *B60L 1/00* | (2006.01) |
| *H02J 7/00* | (2006.01) |
| *H02J 4/00* | (2006.01) |
| *B64D 11/06* | (2006.01) |
| *B60R 16/023* | (2006.01) |

(52) U.S. Cl.
CPC .......... *H02J 7/0027* (2013.01); *B60R 16/023* (2013.01); *B64D 11/0624* (2014.12); *H02J 4/00* (2013.01); *Y02T 50/46* (2013.01)

(58) Field of Classification Search
CPC ......... B60R 16/023; H02J 7/0027; H02J 4/00; Y02T 50/46; B64D 11/0624
See application file for complete search history.

(56) References Cited

U.S. PATENT DOCUMENTS

| | | | |
|---|---|---|---|
| 5,754,445 A | 5/1998 | Jouper et al. | |
| 2004/0195446 A1* | 10/2004 | Smallhorn | B64D 11/0015 244/118.5 |
| 2010/0133907 A1* | 6/2010 | Galasso | H02J 1/14 307/39 |
| 2013/0229050 A1* | 9/2013 | Shipley | H02J 4/00 307/9.1 |

FOREIGN PATENT DOCUMENTS

| | | |
|---|---|---|
| DE | 10 2008 043627 A1 | 5/2010 |
| EP | 2 432 093 A2 | 3/2012 |

OTHER PUBLICATIONS

European Search Report of EP 15192597.1 dated May 1, 2016.

* cited by examiner

*Primary Examiner* — Jared Fureman
*Assistant Examiner* — Duc M Pham
(74) *Attorney, Agent, or Firm* — Wiggin and Dana LLP; Gregory S. Rosenblatt; Jonathan D. Hall

(57) ABSTRACT

A low voltage DC distribution system to provide power to power or charge passenger electronic devices. Cable assemblies pass high voltage power down in daisy chain fashion to various seat groups. Connector elements contain current limiting circuitry which provides low voltage power for distribution to seat electronic components via small gauge wire. Compared to previous systems, embodiments may have a marked reduction in installed weight, encroachment on passenger space, easier installation and reduced impact on seat structures.

18 Claims, 8 Drawing Sheets

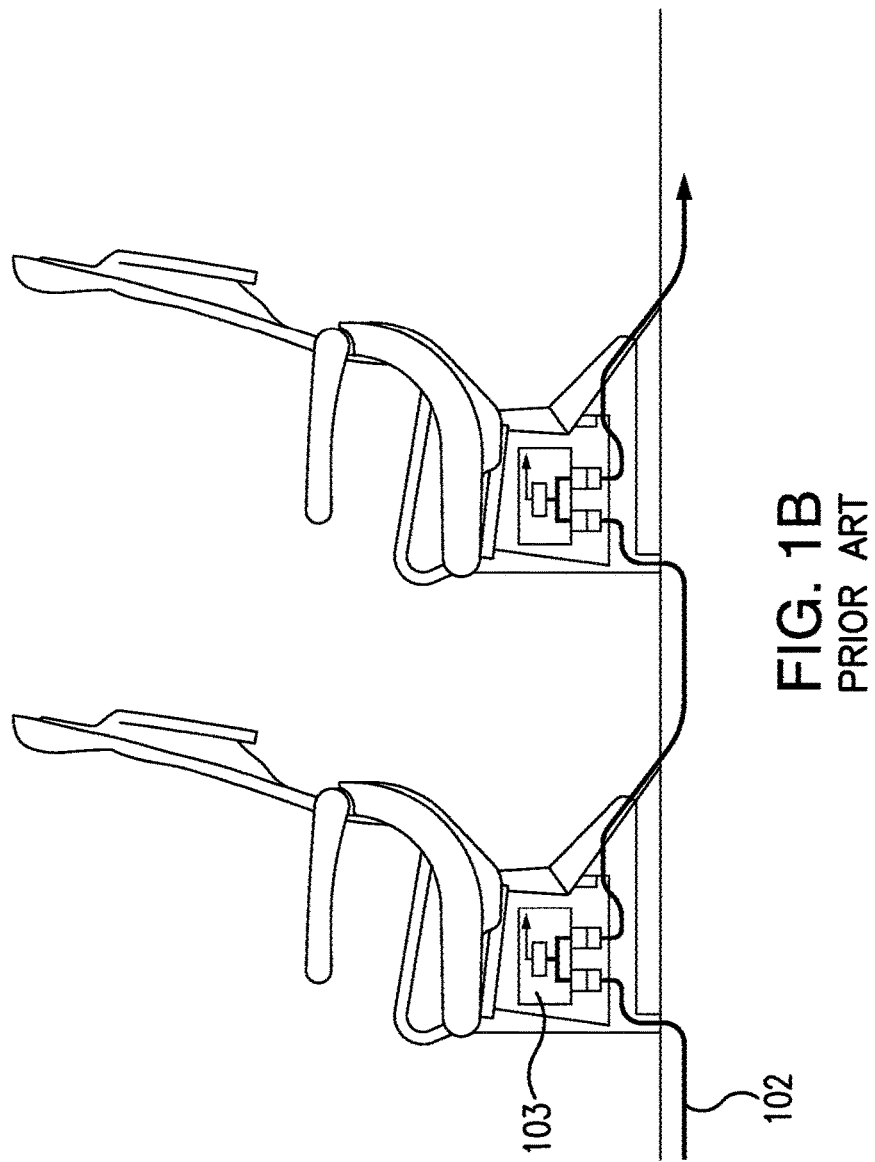

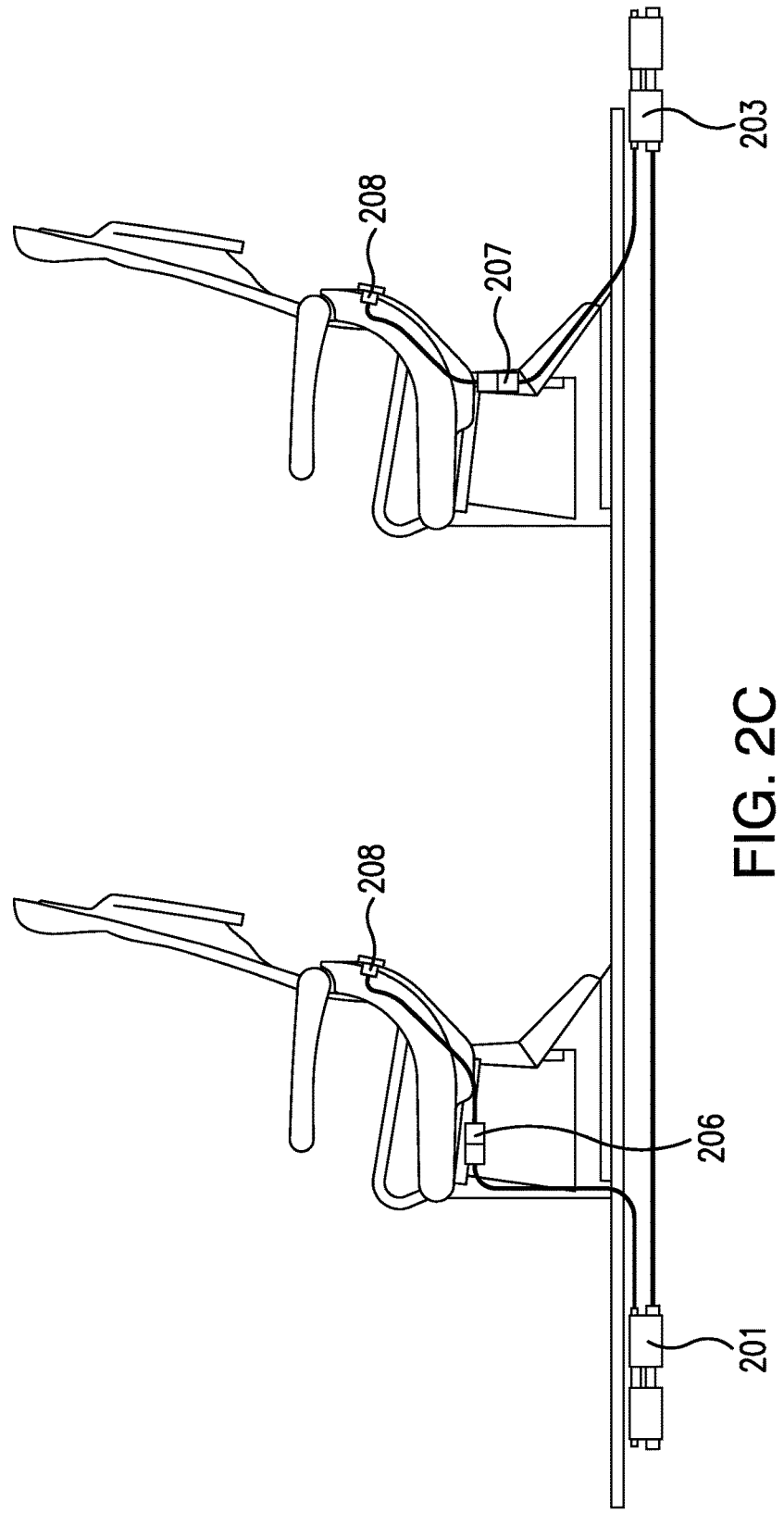

LOW VOLTAGE DC DISTRIBUTION SYSTEM FOR CHARGING PASSENGER DEVICES

CROSS REFERENCE TO RELATED APPLICATION

The present application claims priority to the filing dates of U.S. Provisional Patent Application No. 62/076,982, entitled "Low Voltage DC Distribution System for Charging Passenger Devices" and filed Nov. 7, 2014, and U.S. Provisional Patent Application No. 62/076,879, entitled "Current Limiting Connector Assembly for Power Distribution" and filed Nov. 7, 2014. The disclosures of U.S. 62/076,982 and 62/076,879 are hereby incorporated by reference herein in their entirety.

FIELD OF THE DISCLOSURE

The subject matter of the present disclosure generally relates to power distribution systems, and more particularly relates to low voltage distribution of direct current power.

BACKGROUND OF THE DISCLOSURE

Previous systems for the distribution of power in a limited distribution area with a source of limited power, such as in the case of an aircraft, generally include a master control unit to monitor and distribute alternating current (AC) power to seat mounted electronics boxes (SEBs), outlet units and associated cables. The components or line replaceable units (LRUs), mounting brackets, protective shrouds, extended cable runs etc. all contribute to the weight of conventional systems. U.S. Pat. No. 5,754,445, entitled "Load distribution and management system" and filed Dec. 20, 1995 discloses an exemplary distribution system. The disclosure of U.S. Pat. No. 5,754,445 is hereby incorporated by reference herein in its entirety.

Often, in passenger aircraft the master control unit (MCU) is mounted in an overhead area outside of the passenger space. The MCU distributes three-phase, high voltage power through a number of outputs to groups of SEBs located at the passenger seats. This power is then converted at each seat group to a form usable by the outlet unit (OU) assembly. This conversion is typically performed by a SEB. In the case of an AC system the power provided by the OU is typically 110 volts alternating current (VAC), 60 Hz. In the case of a DC or universal serial bus (USB) output, 28 volts direct current (VDC) is used to power USB outlets, which additionally convert the power locally to 5 VDC for powering USB devices.

In order to save cost and weight, it is desirable that the connected wires be as small as possible. However, if a connected wire were to become overloaded or experience a short circuit, it may be possible for the power source to provide enough current to overheat smaller connected wires. For this reason, wires in these "seat-to-seat" cables are sized to safely carry the maximum current available.

Seat mounted hardware, such as a SEB, requires a mounting bracket which often has a mass requirement designed to ensure the bracket holds the unit in place during a crash and also to protect from vibration and thermally transfer heat away from the SEB to maintain acceptable operating temperatures. In addition to the bracket and its mounting hardware, a shield in the form a metallic or plastic shroud covers the SEB to prevent inadvertent contact with the housing of the hardware. The bracket and shroud are often located on the seat leg or underneath the seat. In either case, the volume of these parts, along with the volume of the SEB, encroach on the passenger space.

In existing power delivery systems on aircraft, cable assemblies carry the power in a daisy chain fashion from one seat group to the next seat group. These cables typically connect to each other within the seat structures. The materials used in electrical wiring are limited in the maximum temperature they can tolerate without degradation. The operating temperature of a wire can be greatly affected by the size of the wire and the amount of current flowing in the wire can generate significant heat. For these reasons, the current in an electrical wire must be controlled to prevent degradation due to excessive heating. At the same amount of current, in comparison to a larger wire, a smaller wire has higher electrical resistance which generates more heat when the current flows through it. The cables connecting the seat groups are generally heavy gauge power wires with proper insulating properties to safely carry the maximum current available. Connector assemblies are often located low on the seat leg with a separate extension cable to where the SEB is located in the seat. Additional cables then route from the SEB to the outlet assembly(s).

All of the mentioned features add weight to the overall system in order to process original aircraft power to power that is suitable for use with passenger devices.

The subject matter of the present disclosure is directed to overcoming, or at least reducing the effects of, one or more of the problems set forth above.

BRIEF DESCRIPTION

Disclosed is a system for delivery of power to various electrical components, such as outlets, in passenger vehicles. In an embodiment, a number of cable assemblies are connected in a "daisy chain" fashion, each cable assembly providing power to a number of outlets associated with various passenger seats. The cable assemblies can be optionally run in a raceway located underneath the floor of the passenger cabin of a vehicle. At least one of the connectors of the cable assembly includes current limiting circuitry, which produces low voltage power for distribution to the outlets. Wiring from the connectors thus may be of smaller gauge than would otherwise be employed to pass high voltage power, and individual SEBs are not required. Optionally, seat group hubs can be used to distribute power from the connectors to a plurality of outlets.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which:

FIGS. 1A-B are depictions of a power delivery system according to the prior art.

FIGS. 2A-C are schematic depictions of a cable assembly according to an embodiment.

Like reference numbers and designations in the various drawings indicate like elements.

DESCRIPTION

Figure 1A:
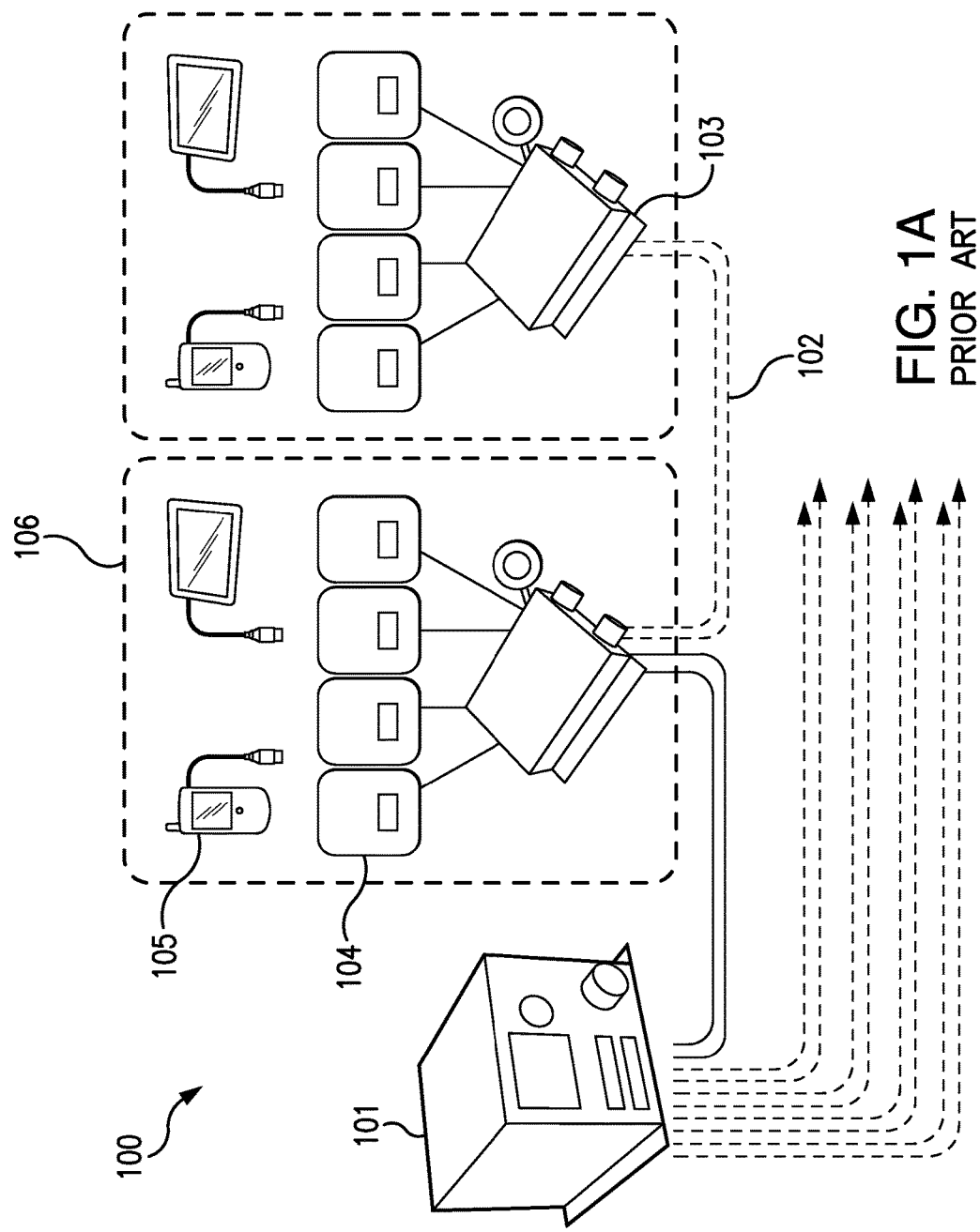

FIGS. 1A and 1B illustrate the manner in which power was typically provided to outlets in previous designs. Power system 100 includes a master control unit 101 which provides power along large gauge supply wiring 102 to SEBs 103. SEBs 103, which are located at the passenger seating, provide power to outlets 104 and thereby to devices 105. SEBs 103 are connected to one another by wiring 102, which must exit the floor raceway at each seat group 106 to connect to SEBs 103. FIG. 1B is a side view depiction of the architecture of FIG. 1A.

Embodiments of the disclosed system are much lighter than previous designs by providing power conversion at a central location, which obviates the need for a SEB, support brackets, leg disconnects, shrouds, etc., and minimizes the need for multi-conductor, heavily insulated seat-to-seat cables. Current state of the art systems are in the range of 120-150 lbs for a complete system of SEBs, brackets, shrouds, cables etc. Certain embodiments decrease the weight to 50-70 lbs. for an entire shipset. This saves an airline 60 percent of the total weight. The system consists of a single or multiple power source, current limiting cable assemblies and outlet units. Advantages of the disclosed subject matter include significant reduction in system weight, cost and complexity.

The power source may be a plurality of power supplies providing an appropriate voltage for distribution and direct use by the outlet units without the need for conversion at the seat. Voltage could also be provided directly from an aircraft power source if it is appropriate for the outlet units being powered. With source currents greater than those that can be carried through the input connector of an outlet unit, a current limiting device is required somewhere between the source and the outlet unit. A convenient location for this current limit is within the distribution circuit between the high current wiring and the wiring to the outlet. This transition happens at the interconnect cable as it leaves the trunk to a branch feeding the seat.

For the purposes of the present disclosure, high voltage generally refers to greater than or equal to 42 VDC and low voltage refers to less than or equal to 28 VDC. Further, large gauge wire refers to wire of gauge 12 (0.0808 inches in diameter) or larger and small gauge wire refers to wire of gauge 20 (0.0320 inches in diameter) and below.

In a first embodiment, a series of cable assemblies carry power from the power source to seat groups along a seat track in a daisy chain fashion. At each end of the cable assembly are connectors for providing the electrical contacts for daisy chaining. These connectors include a current limiting device to provide power to the various seats. A current limiting circuit in the connector allows for a transition from high current large gauge wire to low current small gauge wire for delivery between the connector, a seat group hub, and the seats serviced by the seat group hub. Each connector consists of higher current conductors for interfacing between cable assemblies, and a lower current output connection for connection with a seat group.

Figure 2A:
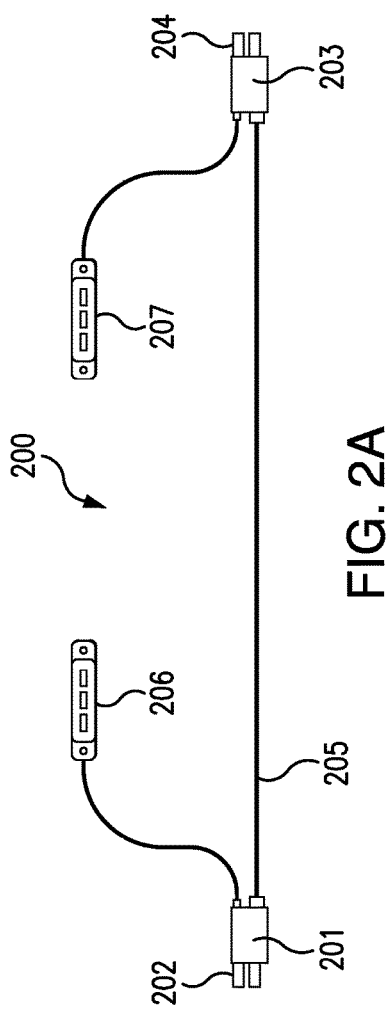
Figure 2B:
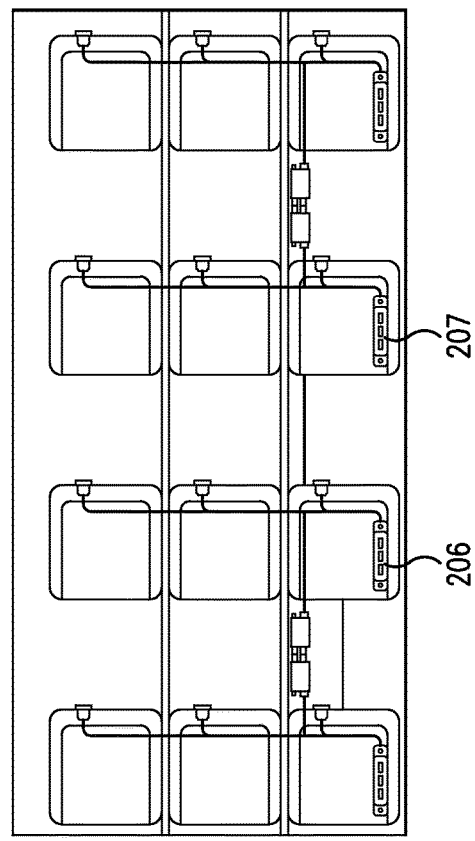

FIG. 2A depicts embodiment cable assembly 200. Input connector 201 has input interface 202 and output connector 203 has output interface 204. Input connector 201 is connected to output connector 203 via connecting cable 205. First seat group hub 206 is connected to input connector 201 and second seat group hub 207 is connected to output connector 203. FIG. 2B is a top view illustration of cable assembly 200 as employed in a passenger cabin. Seat group hubs 206 and 207 provide power to outlets 208. Cable assemblies can be "daisy chained" to provide power to large amounts of seating by connecting the input connector of one cable assembly to the output connector of the previous cable assembly. As both input connector 201 and output connector 203 provide power to a seat group hub, connector assembly 200 is sufficient to provide power to two rows of seats, decreasing the overall number of assemblies required to provide a vehicle with sufficient power for consumer electronics. Reducing the number of connections reduces the cost of the system, increases reliability and decreases weight. FIG. 2C illustrates a side view of a portion of the seating shown in FIG. 2B.

In addition to the current limiting device in a connector, a power line communication circuit could be used to transmit data on the status of each connector, for example information concerning current limits, power being utilized, built-in test status etc.

Figure 3:
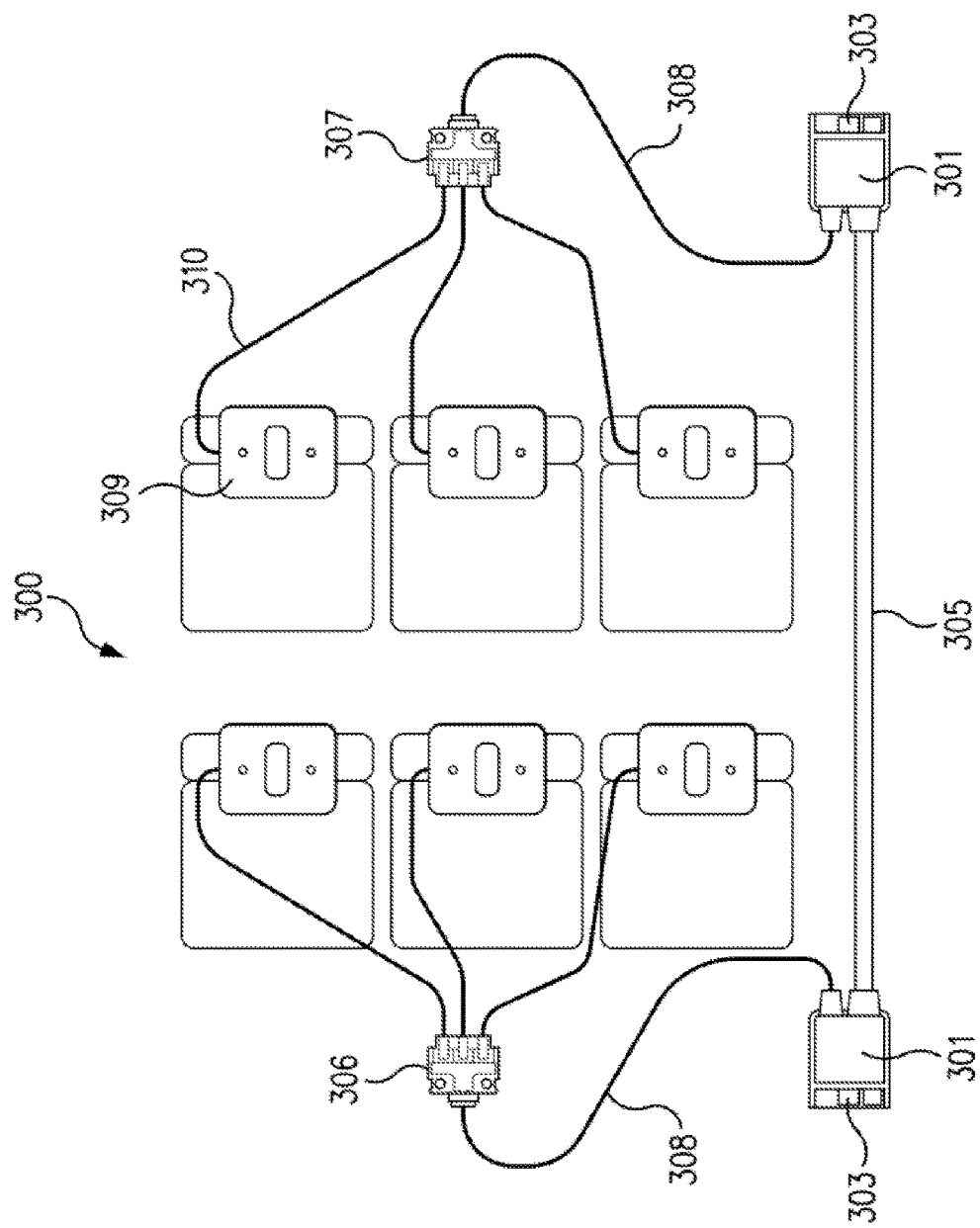
FIG. 3 is a schematic depiction of a cable assembly for delivery of power to USB-type outlets.

FIG. 3 is a schematic illustration of a particular embodiment for use with passenger seating having USB-type outlets. Cable assembly 300 includes input connector 301 and output connector 302, which respectively have input interface 303 and output interface 304, and are connected by connector cable 305. Input connector 301 and output connector 302 are respectively connected to seat group hub 306 and 307 via low-voltage supply wiring 308 and 309. Seat group hubs 306 and 307 each supply power to outlets 309 via outlet wiring 310. As input connector 301 and output connector 302 each contain current limiting circuitry that conditions power to a form suitable for use with outlets 309, small gauge wiring can be used for low-voltage supply wiring 308 and outlet wiring 310 than would be possible if conversion of power was taking place in individual seat electronic boxes. Connections between the various components, for instance between the outlets and the seat group hubs, and between the seat group hubs and the input and output connectors can be modular, or readily detachable. This facilitates quick interchange of defective or outdated components and reduced maintenance.

Figure 4A:
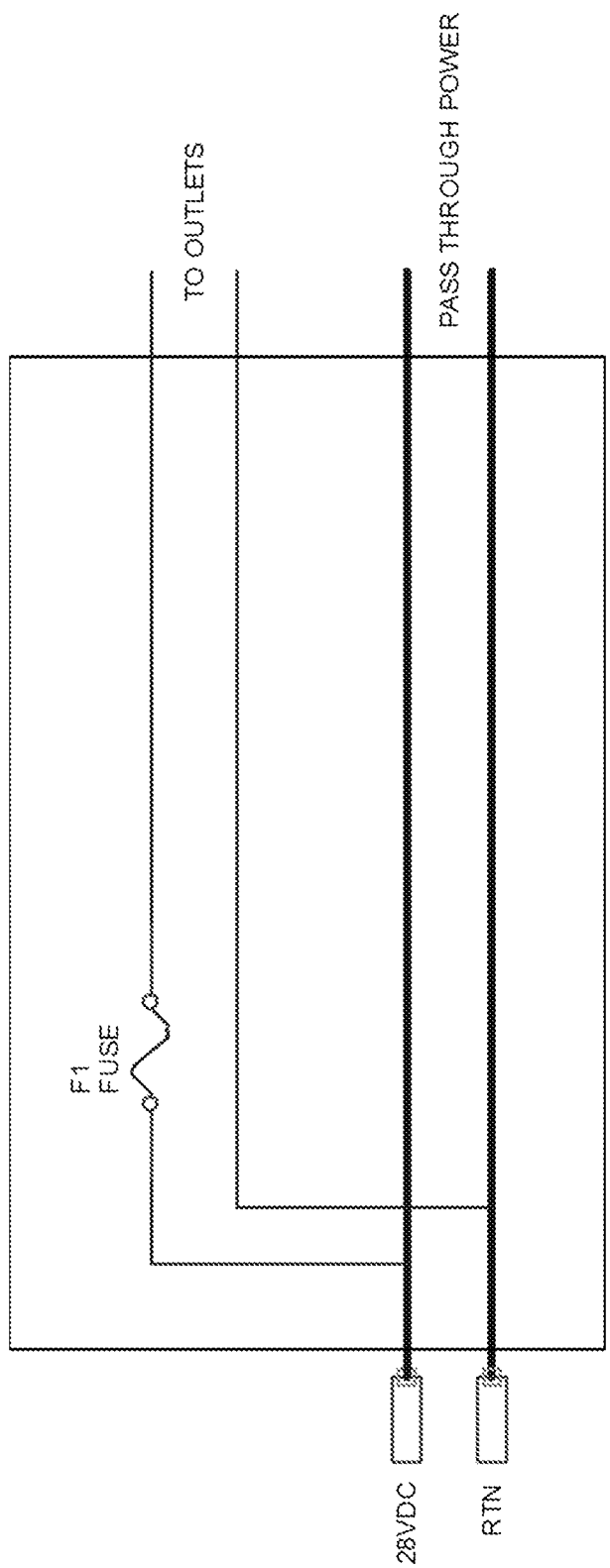
FIGS. 4A-C are schematic depictions of various current limiting devices that can be embedded in the cable assembly.
Figure 4B:
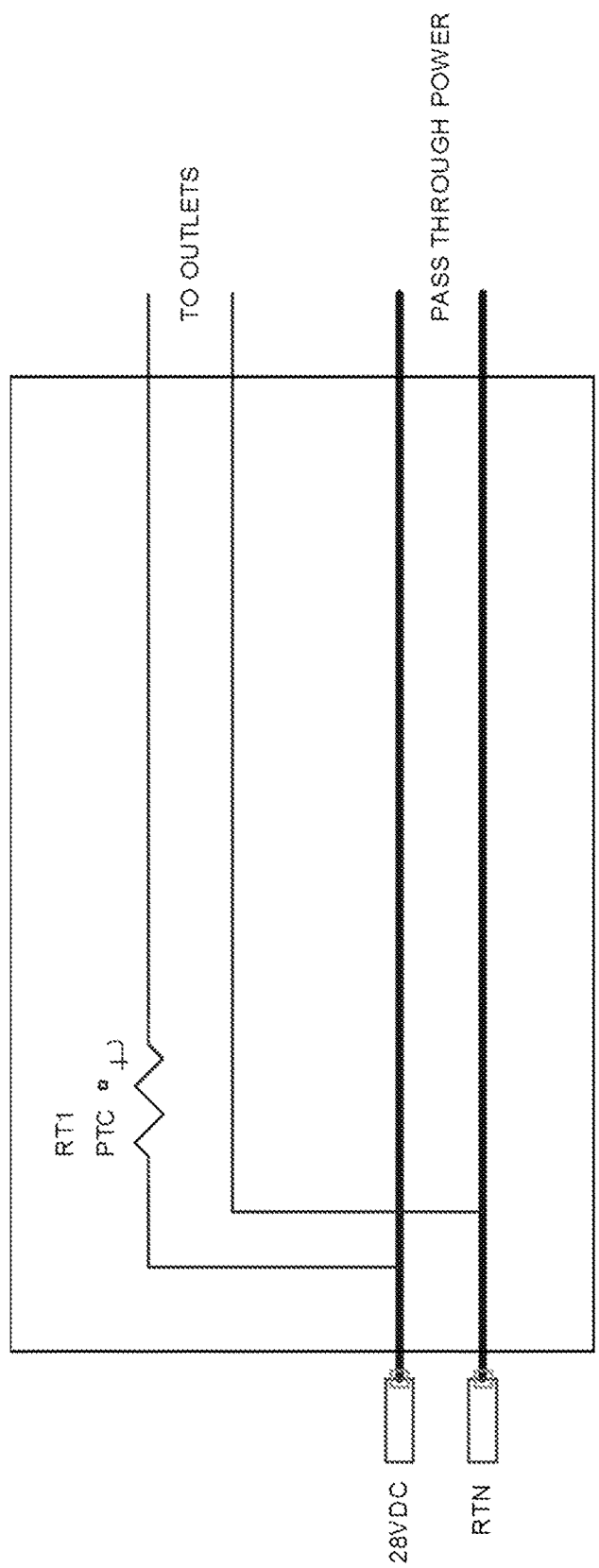
Figure 4C:
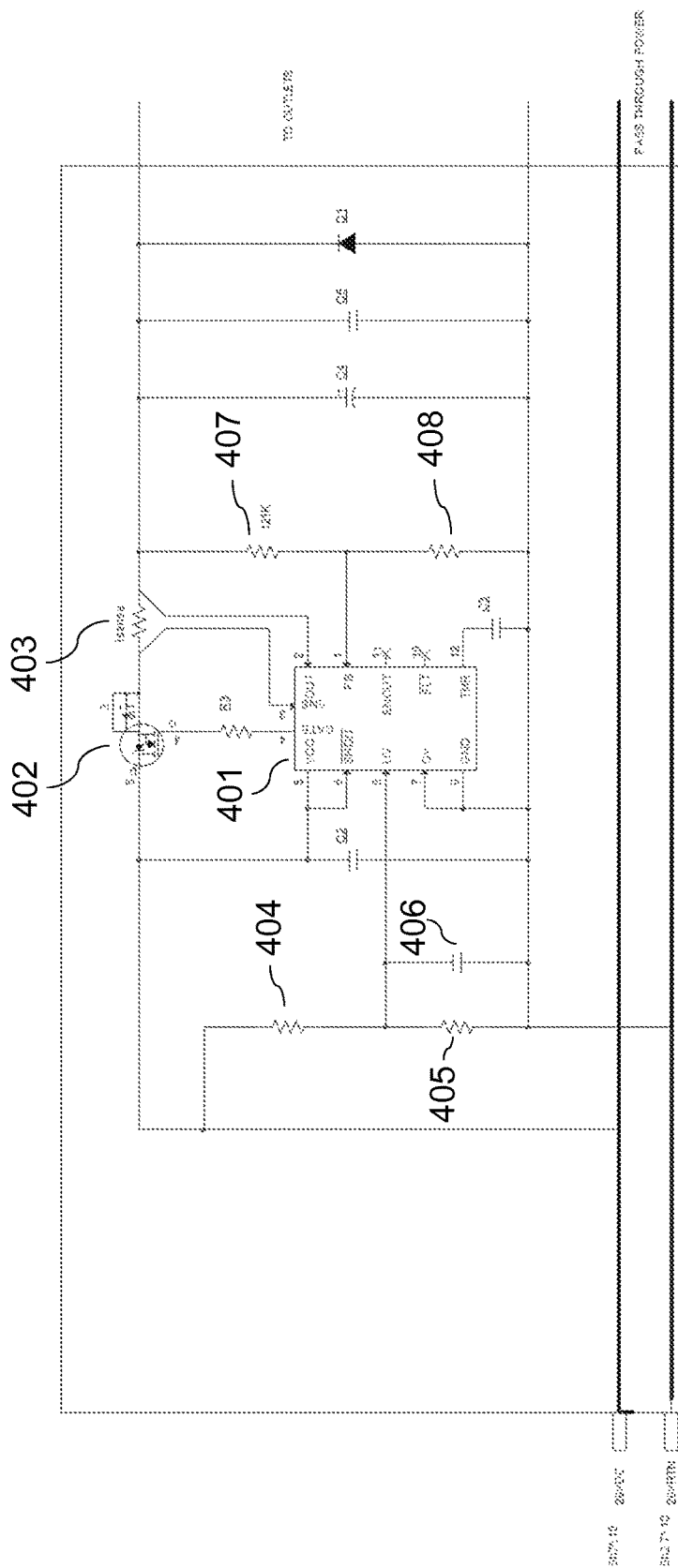

The current limiting function may be implemented by any suitable means such as a fuse, resistor, circuit breaker, or other similar device. Further, there may be one or more current limiting means for each load wire having the same or different current limits depending on the capacity of the connected wires. FIGS. 4A, 4B and 4C are exemplary circuits for implementations using a simple fuse (FIG. 4A), a positive temperature coefficient resistor (FIG. 4B) and a more complex active current limit circuit (FIG. 4C). The choice of a particular current limiting circuit may be made according to the accuracy of current-limit required, cost of implementation and other factors such as weight, tolerance to temperature extremes, physical space, power dissipation etc. Generally, preference is given to the lowest cost and smallest footprint current limit that will meet the system requirements. The components depicted by FIGS. 4A-C can be held within a input connector (such as 301) and can be hermetically sealed to ensure operation in harsh environments. Current carried through the trunk connection along the seat track would typically be in the range of 25 Amps, requiring a large gauge wire to carry the current without significant voltage loss. Branches from the trunk up to the seat group would only require a smaller current such as 1.5 Amps and therefore a much lighter gauge of wire. This is addressed by the current limiting circuit within the connector assembly.

Referring to FIG. 4C, integrated circuit 401 monitors the output current and limits current when a threshold is exceeded. An under voltage shutdown is performed if the source is below a predetermined threshold. An automatic restart can be optionally performed after any fault condition has triggered a limiting event. Integrated circuit 401 may be any appropriate active current limit controller, such as a LT4363 unit manufactured by Linear Technologies Corporation, Milpitas, Calif. In part, integrated circuit 401 protects loads from high voltage transients. It regulates the output during an overvoltage event, such as load dump in vehicles, by controlling the gate of external, N-channel metal oxide semiconductor field effect transistor (MOSFET) 402. The output is limited to a safe value, allowing the loads to continue functioning. Integrated circuit 401 also monitors the voltage drop between the current sense input (SNS) and OUT pins to protect against overcurrent faults. An internal amplifier limits the voltage across current sense resistor 403 to 50 mV. In either fault condition, a timer is started that is inversely proportional to the MOSFET stress. Before the timer expires, the open collector fault output (FLT) pin pulls a low voltage to warn of impending power downage. If the condition persists, the MOSFET is turned off. Depending on the embodiment, the integrated circuit may remain off until it is reset or may restart automatically after a cool down period.

Two precision comparators can monitor the input supply for overvoltage (OV) and undervoltage (UV) conditions. When the potential is below a UV threshold, the external MOSFET is kept off. If the input supply voltage is above an OV threshold, the MOSFET is not permitted to turn back on. In the implementation of FIG. 4C, only the UV circuit has been employed. Resistor 404, resistor 405 and capacitor 406 form a voltage divider to the UV monitor circuit input of integrated circuit 401.

The voltage regulator feedback input (FB) input pin of integrated circuit 401 is used to monitor the output voltage of the circuit through the voltage divider formed by resistor 407 and resistor 408. The exact implementation of the active current limit circuit may vary depending on the needs of the downstream outlets or loads.

The disclosed subject matter may present several advantages. Particularly, because power conversion is not necessary at each individual seat, SEBs, along with their brackets and shrouds, are eliminated, presenting considerable weight savings. Further, the number of conductors in the seat-to-seat cabling is reduced. No ground fault interrupter (GFI) is required as the voltage levels at the passenger seat are considered low voltage.

The use of lower power voltage in the power arriving from the input and output connectors means that no GFI or arc fault detection is required, as voltages are maintained at levels below those considered hazardous.

In certain embodiments, the number of cable interface connectors required with respect to previously existing designs is reduced by up to 75 percent.

Certain embodiments may be made fluid-tight so as to reduce or eliminate the impact of errant liquids. The connectors may be configured so as to only be capable of being connected in a correct manner. Depending on the particular requirements at hand, self-resetting or non-self-resetting current limiters may be employed.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A power distribution system, comprising:
a plurality of passenger seats each having associated with it at least one electrical component requiring a supply of power;
a first and a second cable assembly, each including an input connector, and an output connector, that are connected by a large gauge connecting cable, wherein the output connector of the first cable assembly is electrically interconnected with the input connector, of the second cable assembly;
wherein the first cable assembly is configured to receive high voltage power from a power source and pass it to the second cable assembly in a daisy-chain fashion,
wherein at least one of the input connectors and the output connectors of the first and second cable assemblies include current limiting circuitry configured to convert the high voltage power to an amount of low voltage power; and
wherein the input connectors and output connectors having current limiting circuitry are configured to transmit the low voltage power to at least one of the electrical components via small gauge wire.

2. The power distribution system of claim 1 wherein the cable assemblies having current limiting circuitry supplies the low voltage power to a seat group hub which distributes the lower low voltage power to the at least one of the electrical components.

3. The power distribution system of claim 2 wherein connections between the first and second cable assemblies and the seat group hubs is via small gauge wire.

4. The power distribution system of claim 2 wherein the seat group hubs are connected to the electrical components via small gauge wire.

5. The power distribution system of claim 2 wherein each of the input connectors and output connectors of the first and second cable assemblies supplies the low voltage power to a seat group hub which distributes the low voltage power to a plurality of electrical components.

6. The power distribution system of claim 1 wherein the electrical components are consumer outlets.

7. The power distribution system of claim 1, wherein the power source is a generator on a commercial aircraft.

8. The power distribution system of claim 1 wherein the low voltage power is 28 VDC.

9. The method of claim 1 wherein the current limiting circuitry includes at least one of a fuse, resistor and a circuit breaker.

10. A method of distributing power, comprising the steps of:
providing a first and second cable assembly, each including a input connector and an output connector that are connected by a large gauge connecting cable, wherein the output connector of the first cable assembly is electrically interconnected with the input connector of the second cable assembly; wherein at least one of the input connectors and output connectors of the first and second cable assemblies include current limiting circuitry;
supplying from a power source to the input connector of the first cable assembly an amount of high voltage power, wherein the high voltage power is passed to the output connector of the first cable assembly via the connecting cable of the first cable assembly;
supplying the high voltage power from the output connector of the first cable assembly to the input connector of the second cable assembly, wherein the high voltage power is passed to the output connector of the second cable assembly via the connecting cable of the second cable assembly;

supplying from the input connectors and output connectors having current limiting circuitry an amount of low voltage power to a plurality of electrical components associated with passenger seating via small gauge wire.

11. The method of claim 10 wherein the step of supplying low voltage power includes supplying the low voltage power to at least one seat group hub which distributes the lower voltage power to a plurality of electrical components.

12. The power distribution system of claim 11 wherein connections between the first and second cable assemblies and the seat group hub is via small gauge wire.

13. The power distribution system of claim 11 wherein the seat group hub is connected to the electrical components via small gauge wire.

14. The power distribution system of claim 11 wherein the electrical components are consumer outlets.

15. The power distribution system of claim 10, wherein the power source is a generator on a commercial aircraft.

16. A power distribution system, comprising:

a plurality of seats arranged in successive rows, each seat having associated with it at least one in-seat electrical component;

a plurality of cable assemblies running perpendicular to the rows of seats and being disposed within a cable raceway;

wherein each cable assembly includes an input connector, and an output connector, that are connected by a large gauge connecting cable, wherein the output connector of one cable assembly is electrically interconnected with the input connector of the successive cable assembly;

wherein each cable assembly is configured to receive high voltage power from a proceeding cable assembly and pass it to a successive cable assembly in a daisy-chain fashion;

wherein at least one of the input connectors and the output connectors of each of the cable assemblies include current limiting circuitry configured to convert the high voltage power to an amount of low voltage power; and wherein the input connectors and output connectors having current limiting circuitry are configured to transmit the low voltage power to at least one of the electrical components via small gauge wire.

17. The power distributions system of claim 16, wherein the large gauge connecting cables are sufficient to carry a maximum current.

18. The power distribution system of claim 17, wherein the gauge of the small gauge wire is less than that sufficient to carry the maximum current.

* * * * *